United States Patent [19]

Kalthoff

[11] Patent Number: 4,791,909
[45] Date of Patent: Dec. 20, 1988

[54] SMOKER OVEN

[76] Inventor: Charles W. Kalthoff, 809 Emory Church Rd., Knoxville, Tenn. 37922

[21] Appl. No.: 92,068

[22] Filed: Sep. 2, 1987

[51] Int. Cl.$^4$ .............................................. A23B 4/04
[52] U.S. Cl. .................... 126/21 A; 99/474
[58] Field of Search ............... 126/276, 21 R, 21 A, 126/369.2; 99/473, 474, 481; 34/196, 219

[56]  References Cited

U.S. PATENT DOCUMENTS

| | | | |
|---|---|---|---|
| 1,504,854 | 8/1924 | Baker | 34/196 |
| 1,550,422 | 8/1925 | Braemer | 34/196 |
| 1,590,273 | 6/1926 | Baker | 34/196 |
| 2,419,876 | 4/1947 | Birdseye | 34/57 |
| 2,789,877 | 4/1957 | Pfundt | 312/312 |
| 2,833,201 | 5/1958 | Simank | 126/21 A |
| 3,223,022 | 12/1965 | Powell | 99/259 |
| 3,827,346 | 8/1974 | Tropp et al. | 99/446 |
| 4,510,854 | 4/1985 | Robertson | 126/21 A X |

FOREIGN PATENT DOCUMENTS

| | | | |
|---|---|---|---|
| 430389 | 6/1924 | Fed. Rep. of Germany | 34/196 |
| 493724 | 12/1918 | France | |
| 1484923 | 6/1966 | France | |
| 979972 | 10/1987 | France | |
| 36270 | 11/1922 | Norway | 99/476 |

Primary Examiner—James C. Yeung
Assistant Examiner—Carl D. Price
Attorney, Agent, or Firm—Luedeka, Hodges & Neely

[57] ABSTRACT

The specification discloses a smoker oven for cooking and smoking food including a housing with an uppermost and lowermost cooking chamber. Hot, smoke laden air is produced and circulated inside the housing, and means are provided for directing the flow of circulating air horizontally through each chamber, passing the air through the uppermost and lowermost chambers in essentially opposite horizontal directions. Means for baffling and diffusing the airflow into each cooking chamber provide uniformly distributed horizontal airflow through each cooking member.

6 Claims, 2 Drawing Sheets

SMOKER OVEN

BACKGROUND AND SUMMARY OF THE INVENTION

The present invention relates to cooking devices and more particularly relates to oven type cookers which utilize hot, smoke laden air to cook and flavor food.

Smoked foods are typicaly produced by slowly cooking food in a smoke laden environment. This has long been accomplished by means of a fire or smoker inside a substantially closed container. The fact that undercooked and overcooked food was often produced in the same batch has generally been tolerated. The uneven cooking problem stems from the fact that airflow patterns inside the cooking device have often been left to chance, or at best airflow management inside the device has been given a secondary role.

The present invention focuses on the uneven cooking problem and provides means for circulating, means for directing, and means for baffling the hot, smoke laden air inside the housing so that a uniform horizontal flow pattern contacts food disposed for cooking inside the cooking chambers.

In accordance with the present invention, a smoker oven for smoking and cooking food by passing heated, smoke laden air by the food is provided. A housing has at least uppermost and lowermost cooking chambers configured to form a vertical stack in the housing. Heating means are provided for heating the air inside the housing, and smoking means generate smoke inside the housing. Means are provided for circulating heated, smoke laden air within the housing. Also, means are provided for directing the flow of circulating heated, smoke laden air within the housing. Also, means are provided for directing the flow of circulating air horizontally through each cooking chamber, passing the air through the uppermost and lowermost chambers in essentially opposite horizontal directions. Means are also provided for baffling the flow of air into each cooking chamber so that airflow is uniformly distributed through each cooking chamber.

The advantages and further aspects of the present invention will be readily appreciated by those of ordinary skill in the art as the same becomes better understood by reference to the following detailed description when considered in conjunction with the accompanying drawings.

DETAILED DESCRIPTION

Figure 1:
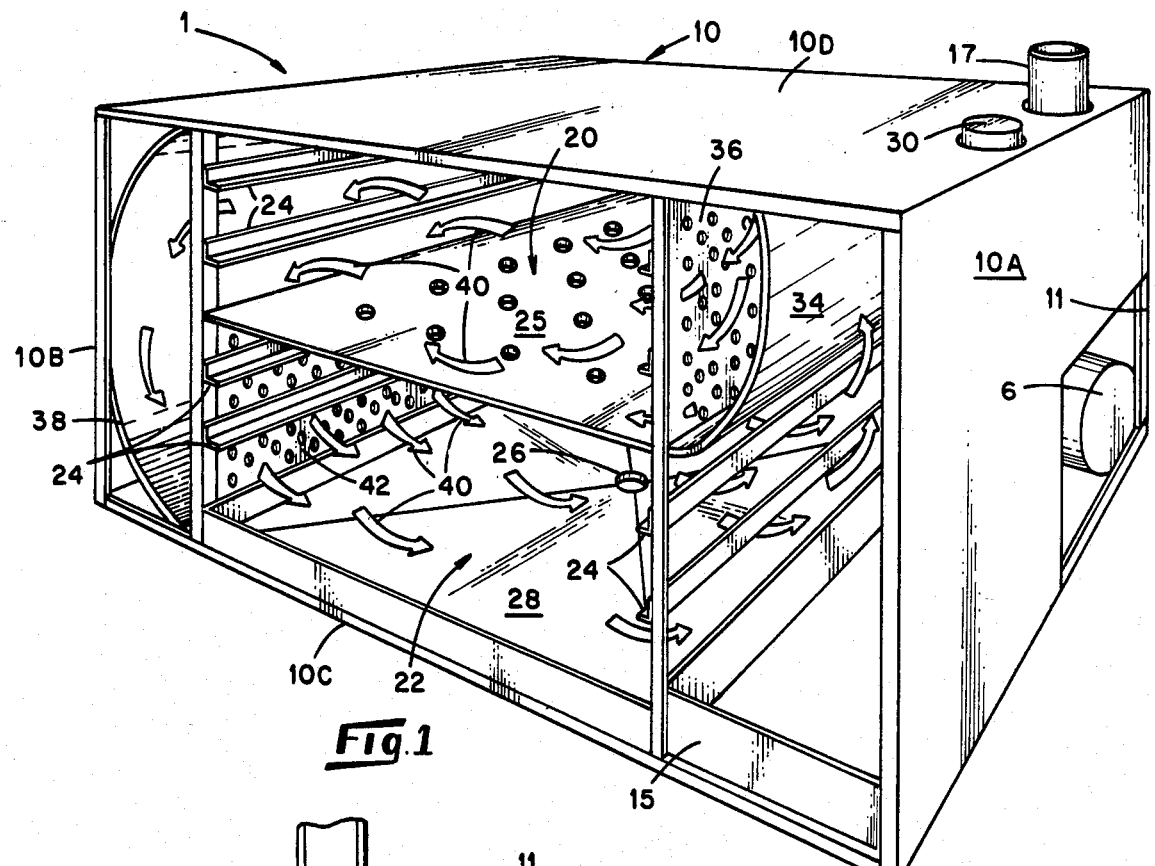
FIG. 1 is a perspective front view of a smoker oven constructed in the preferred form, with a the front panel cut away exposing the firebox.

Referring now to the drawings in which like reference characters refer to like or similar parts throughout the several views, there is shown in FIG. 1 a smoker oven 1 embodying one form of the present invention. A housing 10 configured as the outer walls of a rectangular body encloses and partially defines an upper cooking chamber 20 and a lower cooking chamber 22. An upper drip pan 25 disposed horizontally in the housing 10 forms a rectangular partition between the upper cooking chamber 20 and the lower cooking chamber 22. A generally rectangular firebox 15 is positioned near the first end cover of the housing and is exposed in the drawing by the partial cut away. Preferably the firebox 15 is constructed of sheet metal and holds wood which generates smoke (represented by 19) when heated. Heat passes to the firebox 15 from the burner 6 through a heat tube 21. The heated, smoke laden air is circulated through the housing 10 by a fan means 30 positioned above the firebox 15 and attached to the housing 10. The airflow pattern, indicated in FIG. 1 by a arrow line 40, is generally upward from the firebox 15, horizontally through the upper cooking chamber 20 away from the firebox 15, arcuately downward from the upper cooking chamber 20 to the lower cooking chamber 22, and horizontally through the lower cooking chamber 22 toward the firebox 15.

Figure 2:
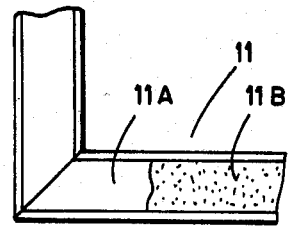
FIG. 2 is an expanded view of a wall portion of the oven.
Figure 3:
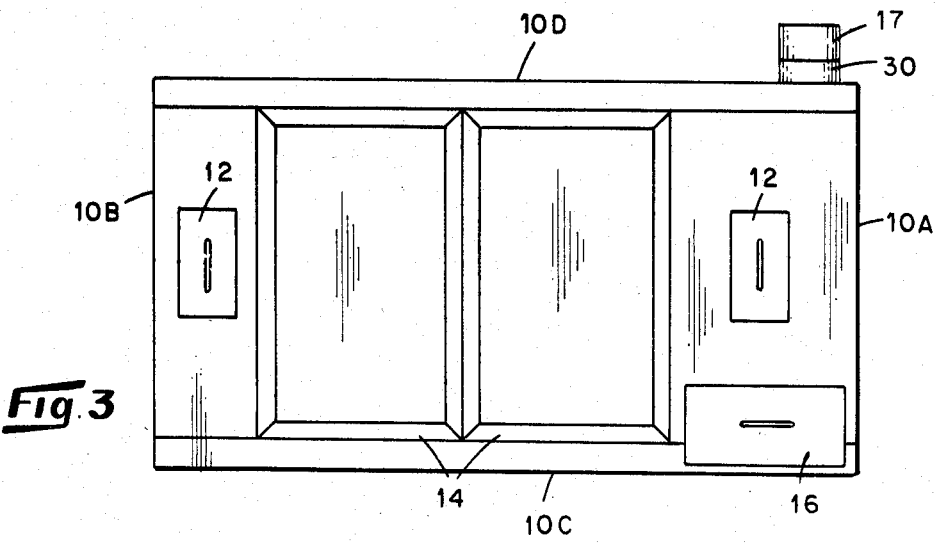
FIG. 3 front view of the oven.

Referring to FIGS. 1, 2 and 3 the preferred housing design and underlying structure can be described. Tubular members 11A are welded to form a frame 11. The members are preferably filled with insulating material 11B. To the frame is attached the housing 10 comprising a front cover 10E, rear cover 10F, first end cover 10A, second end cover 10B, top cover 10D and a bottom cover 10C. Access doors 14 are mounted on the front cover 10E with hinges to provide access to the cooking chambers 20 and 22. Cleanout doors 12 in the front cover 10E allow access to clean away possible smoke precipitate accumulations. A firebox door 16 provides access to the firebox 15 through the front cover 10E. In the preferred design, a gas burner 6 occupies a cubical cavity shown in FIG. 4 at the right, rear, lower portion of the housing 10. An external vent 17 provided in the top cover 10D pipes excess smoke and pressure from inside the housing 10, thus minimizing smoke leakage through the access doors 14, cleanout doors 12, and firebox door 16.

The airflow system of the preferred embodiment of the cooker oven is illustrated in FIGS. 1, 4, 5 and 6. Hot, smoke laden air from the firebox 15 (represented by 19) is pulled upward by a fan means 30 and is pushed through a manifold 32, into a plenum 35, through a perforated chamber wall 36, along an arcuate deflector 38, and through a perforated baffle plate 42 back to the firebox area in a circuitous manner as indicated by arrows 40.

The plenum 35 is essentially a hollow sheet metal duct enclosed by the following surfaces: a portion of the top cover 10D; a portion of the front cover 10E; a portion of the rear cover 10F; a perforated chamber wall 36 which comprises a flat metal plate disposed vertically inside the housing at the first end (right in the drawings) of the upper cooking chamber 20, the chamber wall 36 being generally bounded by the top cover 10D, front cover 10E, rear cover 10F, and upper drip pan 25; and a plenum wall 34 with a generally flat upper portion which lies parallel to the perforated chamber wall 36 at a distance R from the chamber wall 36, and a rounded lower portion configured as an arc of a cylinder arcing upward along the first end of the upper drip pan 25 from the first end of the upper drip pan 25 to the generally flat upper portion of the plenum wall 34 about a radius R forming a concave face toward the perforated chamber wall 36.

The preferred manifold 32 includes a rectangular hollow tube disposed horizontally inside the plenum 35 parallel to the perforated chamber wall 36. The length of the manifold 32 extends substantially from the front cover 10E to the rear cover 10F. The manifold is configured to receive air from the fan means 30 and distribute air along its length into the plenum 35 (see 40, FIG. 6).

Air inside the plenum 35 is pushed through holes in the perforated chamber wall 36. The holes operate to baffle and guide the hot, smoke laden air into a uniform horizontal flow pattern. Tray holders 24 are provided for disposing food horizontally inside the upper cooking chamber 20 and lower cooking chamber 22 so that multiple food pieces are uniformly cooked by the horizontal airflow.

Figure 4:
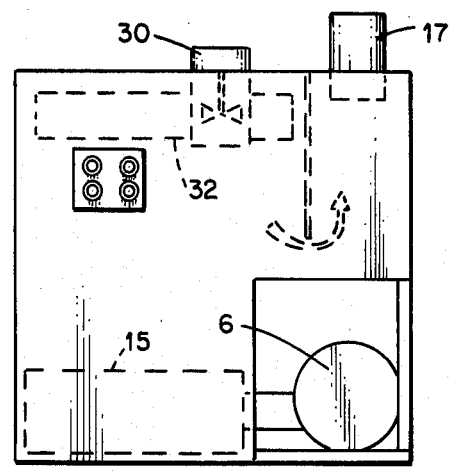
FIG. 4 is a diagrammatic side view of the cooker oven.
Figure 5:
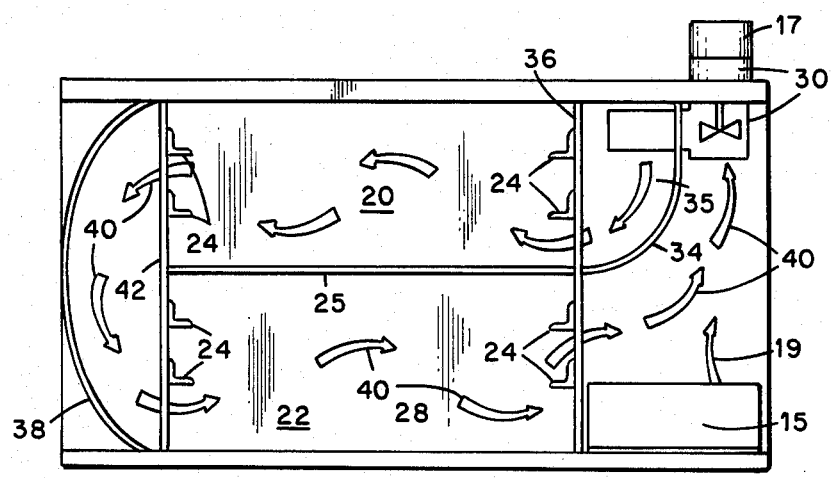
FIG. 5 is a diagrammatic frontal view of the cooker oven with the housing front cover cut away.
Figure 6:
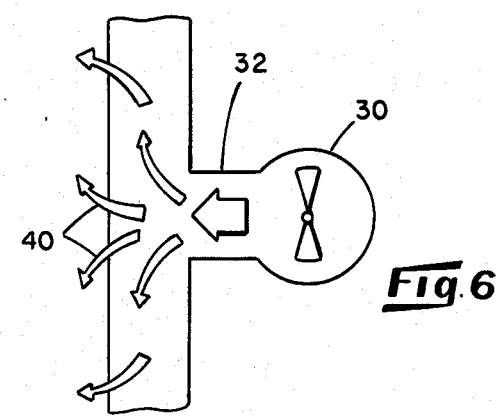
FIG. 6 is an expanded diagrammatic view of a fan and plenum also shown in FIGS. 5 and 6.

An arcuate deflector 38, preferably a rectangular sheet metal plate, is disposed generally vertically within the housing 10 having a pronounced arcuate bend along its length when viewed from the front of the cooker oven as in FIG. 4. The bend in the length of the arcuate deflector 38 arches outwardly away from the cooking chambers toward the second housing end cover 10B forming a concave face toward the cooking chambers. When viewed from the second end of the housing 10, the arcuate deflector 38, when in place, should have dimensions approximating those of the second end cover so that the second end of the housing 10 is effectively sealed by the arcuate deflector 38.

Air passing through the upper cooking chamber 20 is directed along the arcuate deflector 38 toward and into the lower cooking chamber 22. As air enters the lower cooking chamber 22 it must pass through a perforated baffle plate 42 which is preferably a flat metal plate disposed vertically inside the housing 10 along and below the second end of the upper drip pan 25. The perforated baffle plate is generally bounded by the upper drip pan 25, bottom cover 10C, front cover 10E and rear cover 10F. The air passes through holes in the baffle plate 42 which are configured to baffle and guide the air through the lower cooking chamber 22 in a uniform horizontal flow pattern.

Additional components of the preferred cooker oven 1 shown in FIG. 1 include a bottom drip pan 28 disposed under the cooking chambers along the bottom cover 10C and a drain 26 positioned near the center of the bottom drip pan 28 and extending through the bottom cover 10C. The bottom drip pan 28 and drain 26 facilitate sanitary handling of drippings from the food being cooked.

Although a particular embodiment is disclosed herein, it is not intended to limit the scope of the invention and it is understood that the invention is capable of numerous modifications, rearrangements, or substitutions of parts without departing from the scope of the invention as set forth in the appended claims.

What is claimed is:

1. A smoker oven for smoking and cooking food through the medium of heated, smoke laden air circulated repeatedly by food contained within said smoker oven, the smoker oven comprising:
   a housing having at least uppermost and lowermost substantially separate cooking chambers configured to form a vertical stack in said housing;
   means defining an inlet and an outlet end for each chamber, heating means for heating air inside said housing, said heating means being disposed adjacent the outlet end of said lowermost cooking chamber;
   smoking means for generating smoke within said housing to mix with said air to form heated, smoke laden air;
   means for circulating said heated, smoke laden air within said housing, said circulating means comprising a fan means disposed adjacent the inlet end of said uppermost cooking chamber;
   means for directing the flow of circulating heated, smoke laden air horizontally through said uppermost cooking chamber and thence serially through said lowermost cooking chamber such that said heated, smoke laden air moves in essentially opposite horizontal directions within said uppermost and lowermost cooking chambers; and
   means for baffling the flow of heated, smoke laden air into each cooking chamber so that said heated, smoke laden air is substantially uniformly distributed into each cooking chamber.

2. The smoker oven of claim 1, wherein said means for circulating and said means for directing and said means for baffling further comprise:
   a substantially enclosed plenum having a manifold disposed within said plenum for receiving smoke laden air from said fan means and distributing said heated, smoke laden air substantially uniformly into said plenum, and a perforated chamber wall defining the inlet end of said uppermost cooking chamber for introducing smoke laden air into said uppermost cooking chamber, said perforated chamber wall being perforated about its area to deliver smoke laden air to said upper cooking chamber in a plurality of essentially horizontal and uniformly distributed streams to thereby direct said smoke laden air horizontally and uniformly through said uppermost cooking chamber;
   a common reversing chamber disposed in covering relationship to said outlet end of said uppermost cooking chamber and said inlet end of said lowermost cooking chamber for receiving smoke laden air from said uppermost cooking chamber and directing said heated smoke laden air to said inlet end of said lowermost cooking chamber; and
   a perforated baffle plate defining the inlet end of said lowermost cooking chamber, said perforated baffle plate being uniformly perforated about its area to deliver smoke laden air to said lowermost cooking chamber in a plurality of substantially horizontal and uniformly distributed streams to thereby direct said smoke laden air substantially horizontally and uniformly through said lowermost cooking chamber said lowermost chamber being open at its outlet end to provide for fluid communication with said smoking and heating means.

3. The smoker oven of claim 1 further comprising an arcuate deflector spanning from approximately the top of said uppermost cooking chamber to the bottom of said lowermost cooking chamber, said deflector covering the outlet end of said uppermost cooking chamber and the inlet end of said lowermost cooking chamber and arching outwardly from said uppermost and lowermost cooking chambers to form a reversing chamber that is operable to reverse the horizontal direction of flow of said smoke laden air from said uppermost cooking chamber to said lowermost cooking chamber and to direct said smoke laden air from said uppermost cooking chamber to said lowermost cooking chamber.

4. The smoker oven of claim 1, wherein said smoking means further comprises a firebox for containing wood.

5. The smoker oven of claim 4, wherein said heating means comprises a burner means having a heat tube extending into said firebox.

6. A smoker oven capable of converting wood to smoke for smoking and cooking food through the medium of heated, smoke laden air circulated repeatedly by food contained within said smoker oven, the smoker oven comprising:

a housing having first and second ends and uppermost and lowermost cooking chambers defined within said housing, said chambers having inlet and outlet ends with said uppermost cooking chamber disposed immediately above said lowermost cooking chamber;

a firebox for holding wood, said firebox disposed laterally between the first end of said lowermost cooking chamber and the first end of said housing;

heating means for heating the air inside said housing and operative to convert the wood into smoke;

fan means positioned toward the first end of said uppermost cooking chamber and disposed above said firebox and adjacent the inlet end of said uppermost cooking chamber for receiving smoke and heat enriched air;

a substantially enclosed plenum, operative to exhaust air into said uppermost cooking chamber;

a manifold means disposed substantially within said plenum and distributing said heated, smoke laden air substantially uniformly into said plenum;

a perforated chamber wall disposed between said plenum and said uppermost cooking chamber, said perforated chamber wall being perforated to deliver a plurality of substantially horizontal and uniformly distributed streams to thereby direct said smoke laden air substantially horizontally and uniformly through said uppermost cooking chamber;

an arcuate deflector spanning from approximately the top outlet end of said uppermost cooking chamber to the bottom inlet end of said lowermost cooking chamber, said deflector covering the outlet end of said uppermost cooking chamber and the inlet end of said lowermost cooking chamber and arching outwardly from said cooking chambers to form a reversing chamber that is operable to direct said smoke laden air from said uppermost cooking chamber to said lowermost cooking chamber and reverse the horizontal direction of the flow of said smoke laden air; and a perforated baffle plate disposed between said reversing chamber and said inlet end of said lowermost cooking chamber, said perforated baffle plate being perforated to deliver a plurality of substantially horizontal and substantially uniformly distributed streams to thereby direct said smoke laden air substantially horizontally and uniformly through said lowermost cooking chamber, said outlet end of said lower chamber being in fluid communication with said firebox and said heating means to thereby redirect said smoke laden air to said firebox and said heating means.

* * * * *